United States Patent [19]

Kawasaki et al.

[11] Patent Number: 4,962,315

[45] Date of Patent: Oct. 9, 1990

[54] METHOD AND APPARATUS FOR MEASURING RADIOACTIVITY

[75] Inventors: Satoru Kawasaki; Masahiro Kondo, both of Hitachi, Japan

[73] Assignee: Hitachi, Ltd., Tokyo, Japan

[21] Appl. No.: 291,159

[22] Filed: Dec. 28, 1988

[30] Foreign Application Priority Data

Dec. 29, 1987 [JP] Japan ................. 62-334101

[51] Int. Cl.⁵ ............................................. G01T 1/167
[52] U.S. Cl. .................. 250/336.1; 250/360.1; 250/393; 250/395
[58] Field of Search ............ 250/336.1, 394, 393, 250/395, 360.1

[56] References Cited

U.S. PATENT DOCUMENTS 4,591,720 5/1986 Fuji et al. .................. 250/362
4,777,367 10/1988 Kawasaki et al. ............... 250/336.1

FOREIGN PATENT DOCUMENTS 115974 9/1981 Japan .
107183 5/1986 Japan .
168080 7/1987 Japan .
179684 8/1987 Japan .
200279 9/1987 Japan .

Primary Examiner—Carolyn E. Fields
Attorney, Agent, or Firm—Antonelli, Terry, Stout & Kraus

[57] ABSTRACT

A method of and apparatus for measuring radioactivity, which determines energy spectra of radiation rays which are detected by a radiation sensor through a collimator arranged in front of a radiation detector, calculates a spectrum index on the basis of an intensity of scattered rays and an intensity of unscattered rays among the radiation rays determined by distribution of the energy spectra, calculates a density of the object to be measured or a value relating to the density of the density of the object to be measured on the basis of the spectrum index, and meters the radioactivity of the object to be measured on the basis of the value relating to the density and the intensity of the unscattered rays by one measuring step for every cross-section of the object to be measured.

9 Claims, 5 Drawing Sheets

METHOD AND APPARATUS FOR MEASURING RADIOACTIVITY

BACKGROUND OF THE INVENTION

The present invention relates to a method and apparatus for nondestructively measuring the radioactivity of the content in a radioactive waste storage container (referred to merely as "storage container" hereinafter) such as a drum, and more particularly, it relates to a radioactivity measuring method and apparatus adapted to easily measure the radioactivity of γ-ray radiation nuclear material having unknown density and radioactivity distribution stored in a storage container.

Methods of measuring the radioactivity the contents of a storage container having an unknown density have already been proposed, as disclosed in the Japanese Patent Laid-Open Nos. 56-115,974 and 61-107,183. In the conventional radioactivity measuring method disclosed in the Japanese Patent Laid-Open No. 56-115,974, the weight of the contents in a storage container whose radioactivity is to be known is measured, then an average density is calculated by dividing the thus measured value of such weight by the volume of the container, and the radioactivity in the storage container is measured with the use of the calculated average density. However, there has been a problem that this conventional method cannot be used in the case where the density of the contents changes widely in an axial direction of the storage container.

On the other hand, in another conventional radioactivity measuring method as disclosed in the Japanese Patent Laid-Open No. 61-107,183 the density of the contents in the storage container is obtained with the use of a radiation detector and an external γ-ray source which face each other with a storage container therebetween and the radioactivity of the contents in the storage container is measured with the use of the thus obtained density. In this case, the measurement is performed in each of cross-sections (of the container) having different axial heights determined by a collimator positioned in front of the radiation detector, and the whole radioactivity in the storage container is determined by the result of such measurements. Accordingly, in this conventional method, in order to discriminate the γ-ray radiated by the contents in the container from the γ-ray radiated by the external γ-ray radiating source, for each of the predetermined cross-sections of the container, two radiation measurements with and without the external γ-ray source must be performed, thus causing a problem that it takes a relatively long time to measure the whole radioactivity in the storage container.

SUMMARY OF THE INVENTION

An object of the present invention is to provide a method and apparatus for measuring radioactivity, which can measure the radioactivity of the contents in a storage container in a short time with one measurement per each of the predetermined cross sections of the container even when the density of the contents in the container are unknown.

Another object of the present invention is to provide a method and apparatus for measuring radioactivity, which can measure the radioactivity in a storage container and can determine density of the contents in the container, with a simple construction.

Other object of the present invention is to provide a method and apparatus for measuring radioactivity, which can measure the radioactivity of the container in a storage container without determination of density of the contents in the container.

According to the present invention, energy spectra of γ-rays emitted from an object (contents in the storage container) which are detected by a radiation detector through a collimator arranged in front of a radiation detector is calculated, then a spectrum index is calculated on the basis of the intensities of scattered rays and unscattered rays of the radiation determined from the distribution of the energy spectra, then a value relating to a density which relates to the density of the object is calculated from the spectrum index, and the radioactivity of the object is determined from the value relating to the density and intensity of the unscattered rays.

DETAILED DESCRIPTION OF THE PREFERRED EMBODIMENTS

The present invention will now be explained in connection with preferred embodiments thereof with reference to the accompanying drawings.

Figure 1:
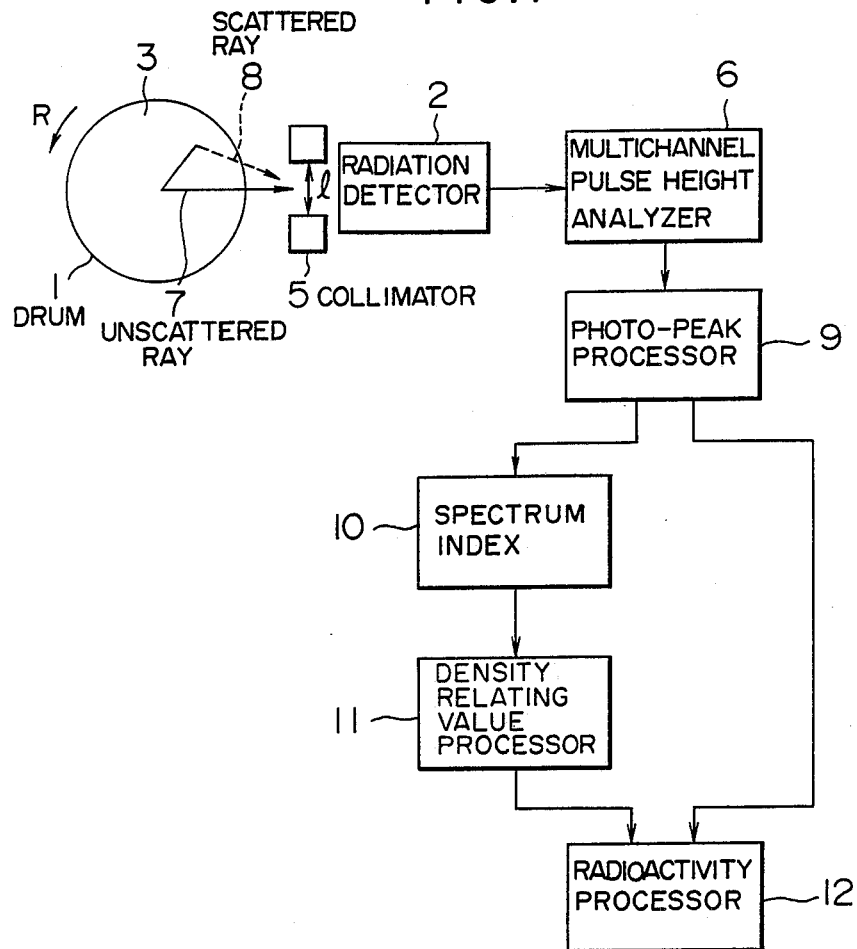
FIG. 1 is a schematic view of a radioactivity measuring apparatus according to a preferred embodiment of the present invention.
Figure 2:
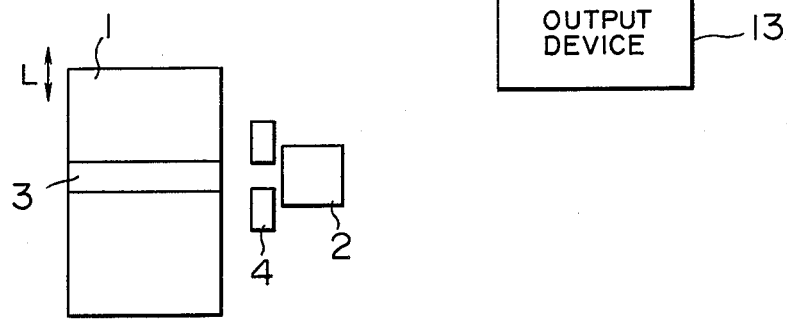
FIG. 2 is an elevational view of a part of the apparatus show in FIG. 1.

FIGS. 1 and 2 show a radioactivity measuring apparatus according to a first embodiment of the present invention. In this embodiment, a drum 1 is used as a storage container which is an object to be measured, and, for the brevity of explanation, it is assumed that the drum contains only one nuclide which emits a γ-ray having a monochromatic energy In FIGS. 1 and 2, the drum 1 as an ob3ect to be measured can be rotated in a direction R by means of an appropriate rotating means (not shown), and can also be lifted and lowered in the axial direction L of the drum by means of an appropriate lifter (not shown). The γ-ray radiated from the interior of the drum 1 is measured by a radiation detector 2. The radiation detector 2 may be, for example, an NaI (Tl) scintillator. A vertical collimator 4 is arranged in front of the radiation detector 2 in such a manner that the detector 2 can detect or measure only the γ-ray emitted from the radioactivity in a cross-section 3 in the longitudinal or axial direction L of the drum. Further, in front of the radiation detector 2, a horizontal collimator 5 is provided for correcting the efficiency of detection for the position of the γ-ray radiating nuclear material in the cross-section 3.

An output from the radiation detector 2 is transmitted to a multichannel pulse height analyzer 6, which determines the energy spectrum based on unscattered rays 7 radiated in the drum 1 and passed through the drum 1 and scattered rays 8 once scattered in the drum and thereafter passed through the drum. An output of the multichannel pulse height analyzer 6 is transmitted to a photo-peak processor 9 which calculates respective counting rates based on the unscattered rays 7 and the scattereo rays 8. These counting rates represent the intensities of the unscattered rays 7 and the scattered rays 8. An output from the photo-peak processor 9 is transmitted to a spectrum index processor 10, where a ratio between the intensity of the scattered rays 8 and the intensity of the unscattered rays 7 is calculated as an example of a spectrum index. An output from the spectrum index processor 10 is transmitted to a density relating value processor 11, where an average density of the contents in the cross section 3 of the drum is calculated from the spectrum index. Outputs from the photo-peak processor 9 and the density relating value processor 11 are transmitted to a radioactivity processor 12, which calculates radioactivity in the cross-section 3 on the basis of the counting rate of the unscattered rays 7 and the average density, and also calculates a total amount of the radioactivity in the drum by adding the values of the radioactivity in all of the predetermined cross-sections of the drum. Data obtained by the radioactivity processor 12 is outputted from an output device 13 such as a printer or a CRT.

The photo-peak processor 9, spectrum index processor 10, density relating value processor 11 and radioactivity processor 12 can be constructed by microcomputers.

Next, the operation of the radioactivity measuring apparatus so constructed will be explained.

In order to determine the amount of the radioactivity of the γ-ray radiating nuclear material in the drum on the basis of the intensity of the γ-rays measured around the drum, the measured intensity of the unscattered γ-rays must be corrected on the basis of the efficiency of detection (detection efficiency) of the measuring system depending upon the distribution of the radioactivity and the distribution of density of the contents in the drum. To this end, the measuring system comprising the drum 1, collimators 4, 5 and radiation detector 2 is at least once tested before a series of measurements of the radioactivity in the drum is performed.

The distribution of the radioactivity and the distribution of the density of the drum contents in the longitudinal direction of the drum are corrected by setting the aperture width of the vertical collimator 4 in such a manner that the radiation detector 2 observes only one cross-section of the drum in the longitudinal direction thereof, and by measuring all cross-sections of the drum while lifting the drum successively in the longitudinal direction of the drum.

On the other hand, the correction in the cross-section of the drum is effected as follows: As to the distribution of the radioactivity, the aperture width $1_o$ of the horizontal collimator 5 can be so set that the detection efficiency regarding the unscattered rays measured by the radiation detector 2 is constant regardless of positions where the γ-rays are emitted. Accordingly, the measurement is carried out by using such aperture width $1_o$. The optimum aperture width lo is determined by preparing a drum containing a reference substance having a known density. The reference substance may be, for example, water, cement, air or the like. As to the distribution of the density of the contents in the drum, the correction is so carried out that the radioactivity can be accurately measured by selecting an optimum aperture width $1_o$ for the horizontal collimator 5 and by previously determining, as a calibration curve, a relationship between the density of the contents or a value relating to the density of the contents and a spectrum index.

As mentioned above, after the measuring system is set, the radioactivity in each of the cross-sections of the drum is measured in the following manner.

Figure 3:
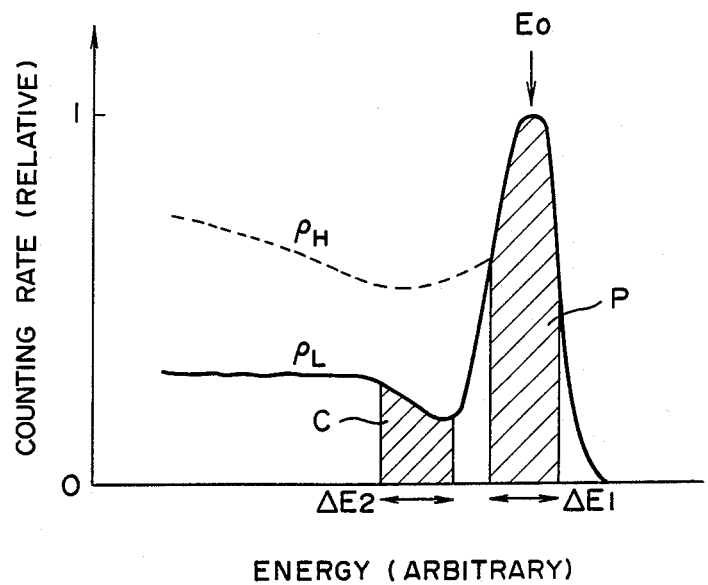
FIG. 3 is the view showing how to determine and the intensities of the scattered rays and intensities of the unscattered rays on the distribution of wave heights of the energy spectra measured by a radiation detector in the radioactivity measuring apparatus.

First of all, in the multichannel pulse height analyzer 6, the energy spectrum of the γ-ray measured by the radiation detector 2 while rotating the drum 1 by one revolution by the rotating means is obtained. The distribution of the pulse heights or this energy spectra is varied in accordance with the density of the contents in the drum 1. When the drum 1 contains only one nuclide which can radiate γ-rays having a monochromatic energ $E_o$, the distrubition of the energy spectra will be as shown in FIG. 3. Generally, as the density of the contents is increased, the γ-rays become easier to be scattered, and the relative value of the intensity C of the scattered rays becomes stronger relative to the intensity of the non-scattered rays while the intensity P of the unscattered rays will be weaker. Normalizing the energy spectra by the photo-peak value of the energy $E_o$ of the unscattered rays reaching the radiation detector 2, the distribution of the energy spectra becomes as shown by a broken line in case of high density $\rho H$ of the contents and becomes as shown by a solid line in case of low density $\rho L$. In FIG. 3, the spectra based on the unscattered rays are in a photo-peak area in the proximity of the energy $E_o$, and, if an energy range $\Delta E1$ including the energy $E_o$ in said photo-peak area is given, the sum P of counting rates in this energy range $\Delta E1$ corresponds to the intensity of the unscattered rays 7. The energy range $\Delta E1$ may be, for example, selected to the energy resolution of the radiation detector 2. Accordingly, in the photo-peak processor 9, by setting the energy range $\Delta E1$ including the energy $E_o$ in the photo-peak area, the sum P of the counting rates in that range is obtained, and therefore the intensity of the unscattered rays 7 is calculated.

Also in FIG. 3, areas other than the photo-peak area are due to the components of the unscattered rays 7, which are scattered in the radiation detector 2, and the scattered rays scattered in the cross-section 3 of the drum. The former components are inherent to the radiation detector 2 and thus the rate of the intensity of the components to the intensity of the unscattered rays does not vary even though the density of the contents in the drum varies. Accordingly, if an energy range $\Delta E2$ is given in a certain area lower than the photo-peak area, for example, in an area lower than and immediately adjacent to the photo-peak area, the sum C of the counting rates in this energy range ΔE2 will correspond to the intensity of the scattered rays 8. Similarly, the energy range ΔE2 may be, for example, selected to the energy resolution of the radiation detector 2. In this way, the photo-peak processor 9 can calculate the intensity C of the scattered rays 8.

The spectrum index processor 10 calculates, as a spectrum index, a ratio C/P between the intensity C of the scattered rays and the intensity P of the unscattered rays on the basis of the data from the photo-peak processor 9.

Figure 4:
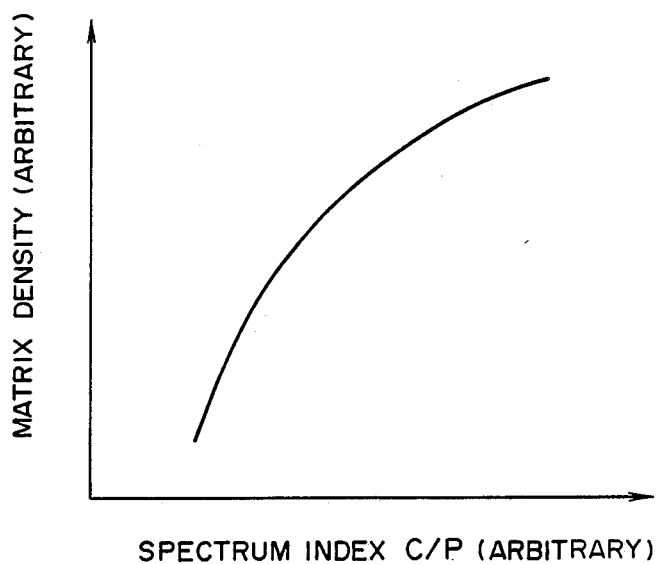
FIG. 4 is a view showing a relationship between a spectrum index and a value relating to the density in the case where the value relating to the density is the average density of the object to be measured.

As can be seen in FIG. 3, the spectrum index C/P depends upon the contents in the cross-section 3 of the drum and varies as shown in FIG. 4. FIG. 4 shows a relationship between the density of the contents and the spectrum index which is obtained when the γ-ray source having a given radioactivity is disposed in the drum and the density of the contents in the drum is varied. The density relating value processor 11 stores therein the following calibration equation (1) which represents the relationship between the density ρ of the contents and the spectrum index C/P as shown in FIG. 4:

$$\rho = f(C/P) \tag{1}$$

Figure 5:
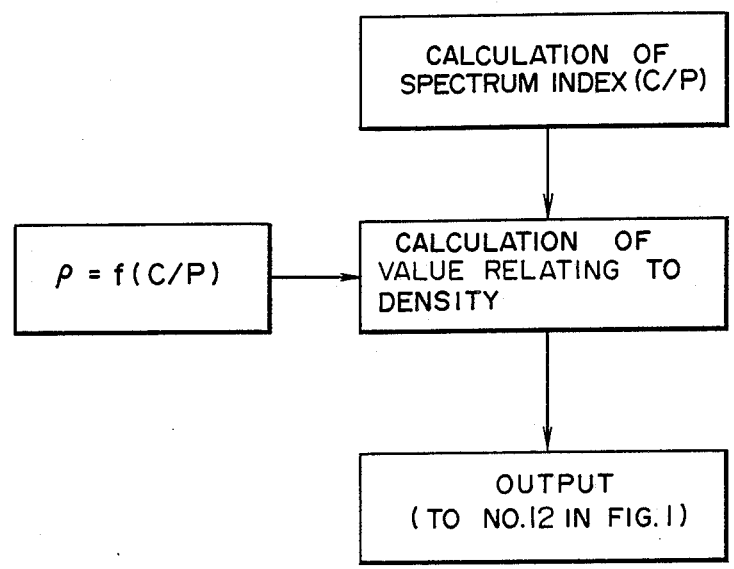
FIG. 5 is a flow chart showing a calculation process for determining the average density from the calibration curve of FIG. 4 in a system for calculating the density relating value.

FIG. 5 shows a process flow chart in the case where the density relating value to processor 11 is constructed by a microcomputer. Along this process flow chart, the density ρ of the contents can be obtained. More particularly, the spectrum index C/P is calculated from the sums P and C of the counting rates in the energy ranges ΔE₁ and ΔE₂, then the density ρ of the contents is calculated from the thus obtained spectrum index C/P and the above-mentioned calibration equation (1), and the value of the density ρ is delivered to the radioactivity processor 12.

In the radioactivity processor 12, the amount of the radioactivity in each cross-section 3 of the drum is calculated from the outputs of the photo-peak processor 9 and the density relating value processor 11 in the following manner.

If the radioactivity in a drum cross-section 3 is A, the radioactivity A and the intensity P of the unscattered rays generally satisfy the following relationship (2), approximately;

$$P = \eta A \exp(-\mu \rho t) \tag{2}$$

where $\mu m$ is a mass attenuation coefficient of the γ-rays depending on energy, which however does not depend upon the kind of the substance in the case of the γ-rays having a energy level higher than about 300 kev; t is an average distance by which the γ-ray passes in the drum cross-section 3, and which may be, for example, selected to the radius r of the drum 1. Further, η is a detection sensitivity which is one of components of the detection efficiency. The detection sensitivity η can be exhibited by the product of the geometrical efficiency and intrinsic efficiency of the radiation detector which mainly depends upon the energy of the unscattered rays and is maintained at a substantially constant value even though the density of the contents varies. If the aperture widths of the vertical and horizontal collimators are determined, the geometric efficiency comes to be constant. Thus, with the use of the measuring system having set collimator aperture widths a nuclear material having the known radioactivity $A_o$ is added to a reference substance having a density $\rho_o$, and the intensity $P_o$ of the unscattered rays passed through the substance is measured. If the intensity $P_o$ is determined, the detection sensitivity η can be calculated from the following equation (3) obtained by modifying the above-mentioned equation (2);

$$\eta = P_o/A_o \exp(\mu m\, P_o r) \tag{3}$$

Accordingly, if the detection sensit.ivity 0 is calculated for the energy E of the unscattered rays corresponding directly to various nuclear materials, the following calibration equation (4) can be previously obtained;

$$\eta = g(E) \tag{4}$$

The calibration equation for the detection sensitivity η, the mass attenuation coefficient $\mu m$, and the average transmission distance r of the ray are previously stored in the radioactivity processor 12. The radioactivity processor 12 calculates at first the detection sensitivity η from the energy E of the unscattered rays delivered from the photo-peak processor 9 and the calibration equation (4). Thereafter, the radioactivity A is calculated from the thus obtained detection sensitivity η, the intensity P of the unscattered rays delivered from the photo-peak processor 9 and the density p of the contents delivered from the density relating value processor 11, by using the following equation:

$$A = P \exp(\mu m\, \rho\, r)/\eta \tag{5}$$

In this way, the radioactivity processor 12 calculates the amount of radioactivity in the drum cross-section 3. Thus, the radioactivity processor 12 can calculate the total amount of radioactivity in the drum by calculating the radioactivity of every cross-section of the drum 1 and then by adding all of the calculated values of the radioactivity of all drum cross-sections.

As explained above, according to the present invention, when measurement conditions such as the aperture widths of the vertical collimator and horizontal collimator, the detection sensitivity, the average transmission distance by the rays and the like are once determined or set, the amounts of the radioactivity in the different cross-sections of the drum can be determined only by measuring the γ-rays emitted from the interior of the drum once per every drum cross-sections thereby, shortening or reducing the measurement time. Further, since the density of the contents in the drum can be obtained without using an external γ-ray source, the apparatus can be simplified.

While the present invention has been explained in the above-mentioned embodiment such that only one nuclear material is contained in a drum, the present invention can be applied in the case where a plurality of nuclides are contained in a drum.

Figure 6:
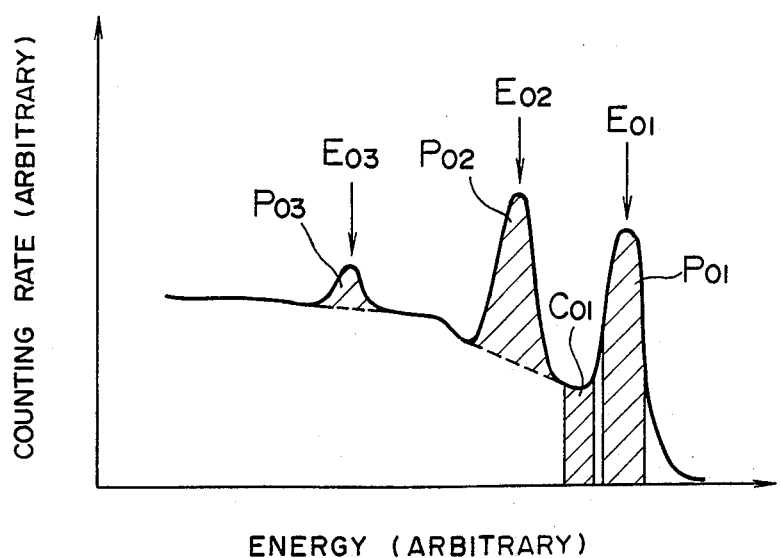
FIG. 6 is a view showing how to determine the intensity of the unscattered rays and intensities of the scattered rays in a radioactivity measuring apparatus according to another embodiment of the present invention.

Hereinafter, the present invention will be explained in connection with a second embodiment that the drum includes a plurality of nuclides with reference to FIG. 6. FIG. 6 shows the distribution of γ-ray spectra measured by the radiation detector 2 in the case where the drum includes a plurality of nuclides, in which $E_{o1}$, $E_{o2}$ and $E_{o3}$ represent the energies of the unscattered rays 7 generated from the respective nuclides. In the photo-peak processor 9 according to the second embodiment of the present invention, the intensity $P_{oi}$ (i=1, 2, 3, ...) of the unscattered rays of the respective nuclides and the intensity $C_{ol}$ of scattered rays of the respective nuclear materials with respect to the highest energy $E_{o1}$ are calculated as follows. First of all, in the same manner as that in the case where the drum includes only one nuclear material as shown in FIG. 3, the intensity $P_{o1}$ of the unscattered rays and the intensity $C_{o1}$ of the scattered rays are calculated for a nuclide having the highest energy $E_{o1}$ of the unscattered rays. By drawing a smooth curve or a straight line (which is shown by a broken line in FIG. 6), on the thus obtained spectra, tangentially to the photo-peak areas, the intensities $P_{o2}$, $P_{o3}$ of the unscattered rays having energy less than $E_{o1}$ are obtained as the sum of the count values or the area above the curve or line. While the spectra of the scattered rays radiated from the inside of the container to be measured are gentle, the spectra of the unscattered rays have peak shapes exhibiting, for example, Gausian distribution. Namely, it may be considered that the thus obtained values of Po2, Po3 depend upon the intensity of the non-scattered rays, substantially.

Next, in the spectrum index processor 10, the spectrum index C/P is calculated from the intensity $C_{o1}$ of the scattered rays and the intensity $P_{o1}$ of the unscattered rays calculated in the photo-peak processor 9 in consideration of the highest energy $E_{o1}$ of the unscattered rays alone as shown in FIG. 6.

The density relating value processor 11 calculates the density $\rho$ of the contents from the above spectrum index according to the process flow chart of FIG. 5.

The radioactivity processor 12 calculates at first the detection efficiency $\eta_{oi}$ for every energy $E_{oi}$ of the unscattered rays of the various nuclides from the value of the intensity $P_{oi}$ of the unscattered rays and from the equation (4) stored in the processor 9. Next, the processor 9 calculates the amounts of the radioactivity $A_{oi}$ ($i=1, 2, 3, \ldots$) of the various nuclear materials from the thus obtained detection efficiency $\eta_{oi}$, intensity $P_{oi}$ of the rays and the density $\rho$ of the contents by the density relating value processor 11 by using the equation (5). In this case, although the mass attenuation coefficient $\mu m$ of the rays is constant as in the case where the drum includes only one nuclear material, in order to enhance the accuracy of the measurement the mass attenuation coefficient of the rays may have a value corresponding to the energy E of the unscattered rays by previously preparing a calibration equation for the energy E of the unscattered rays.

In this way, according to the present invention, even though the drum includes a plurality of nuclides the radioactivity can be obtained for every nuclear material.

In the embodiment mentioned above, the density relating value processor 11 calculates the density $\rho$ of the contents. However, in some cases there is no need to calculate the density $\rho$ of the contents. Thus, explanation will be made hereinbelow of a third embodiment of the present invention in which the radioactivity in the drum is measured by using a value relating to the density of the contents in the drum without calculating the density $\rho$ of the contents.

In the equation (2), when the energy of the $\gamma$-rays is 300 kev or more, since the mass attentation coefficient $\gamma m$ does almost not depend upon the density of the contents and the average distance t of the rays transmitting through the drum cross-section is equal to the radius r of the drum (i.e., is constant), the $\exp(-\mu m \rho r)$ will correspond directly to the density $\rho$ of the contents. Thus, the following equation may be considered for the value relating to the density:

$$F = \exp(\mu m \, \rho \, r)/\eta \tag{6}$$

By using the above-mentioned equation (2), the value F relating to the density of the contents will be rewritten as follows:

$$F = A/P \tag{7}$$

Figure 7:
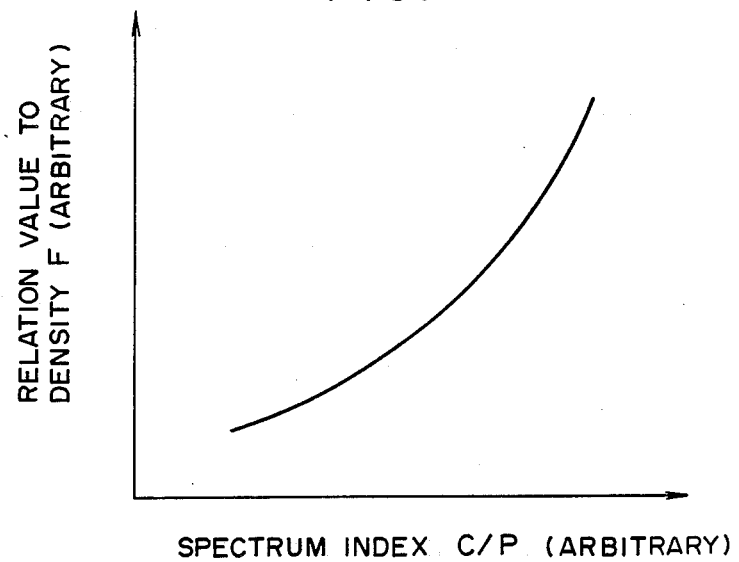
FIG. 7 is a view showing a relationship between a spectrum index and a value relating to the density in the case where the value relating to the density is a ratio between the radioactivity and the intensity of the unscattered ray.

Then, first of all, a nuclear material having a known radioactivity $A_o$ is added to the contents having an unknown density, the intensity $P_o$ of the unscattered rays and the intensity $C_o$ of the scattered rays generated in such contents are measured. Then, the spectrum index $C_o/P_o$ and the value $F_o$ relating to density are calculated from such intensities $P_o$, $C_o$ and the radioactivity $A_o$, and then the relationship between the spectrum index $C_o/P_o$ and the value $F_o$ relating to the density is determined. After determining such a relationship for each of various contents having various different unknown densities, it is possible to obtain the following calibration equation (8) representing a relationship between the relation value F relating to the density and the spectrum index C/P as shown in FIG. 7:

$$F = h(C/P) \tag{8}$$

Further, by modifying the above-mentioned equation (7), the following equation can be obtained:

$$A = PF \tag{9}$$

Thus, for a drum containing contents having an unknown density, it is possible to measure the amount of radioactivity of such contents on the basis of the intensity P of the unscattered rays and the value F relating to the density obtained from the spectrum index C/P. This embodiment has advantages that it is not required to previously determine the detection sensivity $\eta$ for each of various nuclear materials and that there is no need for measuring the density of the contents when the equation (8) is obtained.

In the above-mentioned first and second embodiments, the intensity P of the unscattered rays is in the photo-peak area and the intensity C of the scattered rays is in the area lower that the photo-peak area; however, the present invention is not limited to this case.

Now, a further embodiment (forth embodiment) of the present invention in which the intensity C of the scattered rays and the intensity P of the unscattered rays are set in another way will be explained in connection with FIG. 8. In this embodiment, it is assumed that the drum (object to be measured) contains the nuclear material radiating $\gamma$-rays having a monochromatic energy $E_o$.

Figure 8:
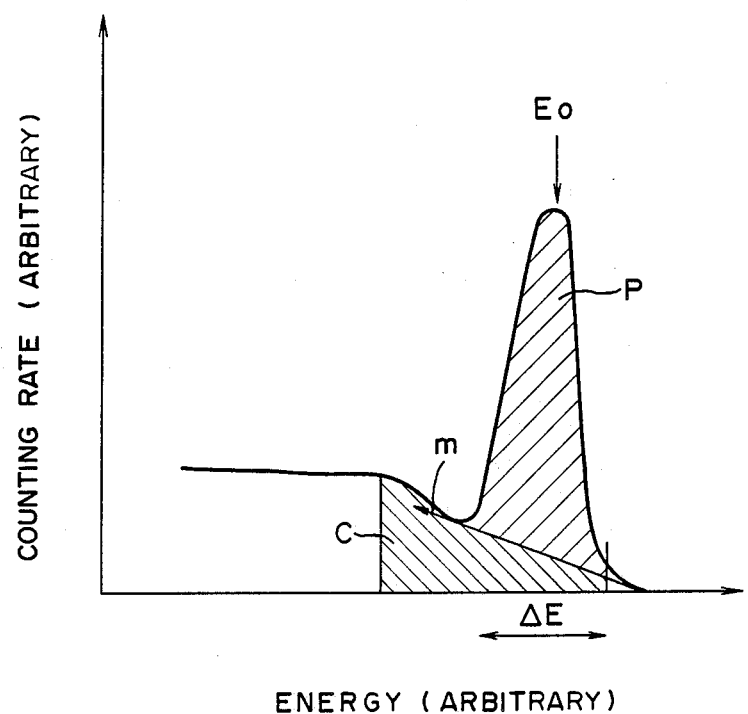
FIG. 8 is a view showing how to determine the intensities of the unscattered rays and the intensities of the scattered rays in a radioactivity measuring apparatus according to a further embodiment of the present invention.

FIG. 8 shows the distribution of energy spectra of such $\gamma$-rays obtained from the output of the radiation detector 2 by the multichannel pulse height analyzer 6. In FIG. 8 a line m is a straight line connecting between a start point and an end point of the photo-peak area in the distribution curve of the wave heights. In this case, when an energy range $\Delta E$ including the energy E is given, the intensity P of the unscattered rays will be represented by an area above the line m in the energy range $\Delta E$ within the photo-peak area and the intensity C of the scattered rays will be represented by an area other than the afore-mentioned area in that energy range. The energy range $\Delta E$ can be taken optionally.

In the above-mentioned explanation, the single nyclide is described; however, this fourth embodiment can also be applied to the case where the drum contains a plurality of different nuclides, by introducing the same consideration as described in the second embodiment, In the fourth embodiment, by means of the photo-peak processor 9 and the density relating value processor 11, the intensity P of the unscattered rays and the spectrum index C/P are determined, respectively, on the basis of such areas divided by the line m.

Further, in the first to fourth embodiments, the ratio C/P between the intensity C of the scattered rays and the intensity P of the unscattered rays is used as the spectrum index; however, the spectrum index is not limited to such ratio. As mainly explained with reference to FIG. 3. in general, as the density of the contents is increased, the $\gamma$-rays become easier to be scattered, and the intensity C of the scattered rays becomes stronger and the intensity P of the unscattered rays comes to be weaker. By normalizing the intensity C of the scattered rays with the energy $E_o$ or intensity $P_o$ of the unscatered rays reachign the radiation detector 2, the intensity C of the scattered rays become relatively weak in the case of a high density of the contensts but relatively strong in the case of a low density of the contents. This means that the spectrum index for determining the value relating to the density requires the ratio C/P between teh intensity C of the scattered rays and the intensity P of the unscattered rays or requires to inlcude the ratio C/P as a main consitituing term. Accordingly, the spectrum index may be in any form if it is a function of the ratio C/P or P/C.

As mentioned above, accordint to the present invention, there can be provided a method and apparatus for measuring radioactivity, which can meter the radioactivity in the storage container in a hsort time by one measurement step for every predetermineed cross-section of the container even when the density of the cotnents in the container are unknown.

Further, the present invention can provide a method and apparatus for measuring radioactivity, which can measure the radioactivity in the storage container and can determine the density of the contents in the container, with a simple construction.

In addition, the present invention can provide a method and apparatus for measuring radioactivity, which can meter the radioactivity in the storage container without determination of the density of the contents in the container.

What is claimed is:

1. A radioactivity measuring method, comprising the steps of:
    determining energy spectra of radiation rays which are emitted from an object to be measured and are detected by a radiation sensor through a collimator arranged in front of a radiation detector;
    calculating a spectrum index on the basis of an intensity of scattered rays and an intensity of unscattered rays determined by distribution of said energy spectra;
    calculating a density of said object to be measured or a value relating to said density of the object to be measured on the basis of said spectrum index; and
    metering radioactivity of said object to be measured on the basis of said value relating to the density and said intensity of the scattered rays.

2. A method according to claim 1, wherein said intensity of the scattered rays is given by a sum of counting rates in a pedetermined energy range below a photo-peak area, and said intensity of the unscattered rays is given by a sum of counting rates in a predetermined energy range in said photo-peak area.

3. A method according to claim 1, wherein a photo-peak area is divided by a straight connecting a start point to an end point of said photo-peak area on a distribution curve of the wave heights and said intensity of the scattered rays is given by a sum of counting rates in a predetermined energy range in said photo-peak area excepting a part above said straight line, while said intensity of the unscattered rays is given by a sum of counting rates in a predetermined energy range in said photo-peak area in said part above said straight line.

4. A method for measuring radioactivity according to claim 1, wherein said object to be measured is a drum including a drive mechanism for rotating, lifting and lowering said drum.

5. A radioactivity measuring method comprising the steps of:
    determining energy spectra of radiation rays which are emitted from an object to be measured and are detected by a radiation sensor through a collimator arranged in front of a radiation detector;
    calculating a spectrum index defined by a function of a ratio in intensity between unscattered rays and scattered rays determined by distribution of said energy spectra; and
    metering radioactivity in a cross-section of said object to be measured by one measuring step, by calculating a density of said object to be measured or a value relating to said density of the object to be measured on the basis of a relationship between the previously calculated spectrum index and said ensity of said object to be measured or said value relating to the density of the object to be measured.

6. A method for measuring radioactivity comprising the steps of:
    determining energy spectra of radiation rays which are emitted from an object to be measured and are detected by a radiation sensor through a collimator arranged in front of a radiation detector;
    calculating a spectrum index defined by a function of a ratio in intensity between unscattered rays and scattered rays determined by distribution of said energy spectra; and
    metering a radioactivity of said object to be measured without caluclating a density of said object to be measured on the basis of a relationship between the previously calculated spectrum index and a value relating to said ensity of said object to be measured.

7. A radioactivity measuring apparatus comprisiing a radiation detector for detecting radiation rays emitted from an object to be measured and a collimator means arranged in front of said radiation detector, further comprising:
    means for determining an energy spectra of said radiation rays;
    means for calculating an intensity of scattered rays and an intensity of unscattered rays on the basis of distribution of said energy spectra;
    means for calculating a spectrum index determined by said intensity of the scattered rays and said intensity of the unscattered rays;
    means for calculating a value relating to a density of said object to be measured on the basis of said spectrum index; and
    means for metering radioactivity of said object to be measured on the basis of said value relating to the density and said intensity of the unscattered rays.

8. A radioactivity measuring apparatus according to claim 7, further comprising a drive mechanism for rotating, lifting and lowering said object to be measured.

9. A radioactivity measuring apparatus according to claim 7, wherein said object to be measured is a drum, and further comprising a drive mechanism for rotating, lifting and lowering said drum.

* * * * *